(12) United States Patent
Justin

(10) Patent No.: US 11,777,330 B2
(45) Date of Patent: Oct. 3, 2023

(54) COMMON CHARGE CONTROLLER FOR ELECTRONIC DEVICES WITH MULTIPLE BATTERIES

(71) Applicant: Microsoft Technology Licensing, LLC, Redmond, WA (US)

(72) Inventor: Ajit Justin, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 415 days.

(21) Appl. No.: 16/936,064

(22) Filed: Jul. 22, 2020

(65) Prior Publication Data
US 2022/0029439 A1 Jan. 27, 2022

(51) Int. Cl.
*H02J 7/00* (2006.01)
*G06F 1/26* (2006.01)

(52) U.S. Cl.
CPC .......... *H02J 7/0048* (2020.01); *H02J 7/0013* (2013.01); *H02J 7/0071* (2020.01); *H02J 7/00712* (2020.01); *G06F 1/263* (2013.01); *H02J 7/007182* (2020.01)

(58) Field of Classification Search
CPC ...... H02J 7/0048; H02J 7/0013; H02J 7/0071; H02J 7/00712
USPC ......................................................... 320/162
See application file for complete search history.

(56) References Cited

U.S. PATENT DOCUMENTS

| | | | | |
|---|---|---|---|---|
| 5,387,857 A * | 2/1995 | Honda | ................... | H02J 7/0016 320/120 |
| 5,504,416 A * | 4/1996 | Holloway | ......... | H02J 7/007182 320/152 |
| 6,104,165 A * | 8/2000 | Miyamoto | ............ | H01M 10/44 320/136 |
| 6,118,250 A * | 9/2000 | Hutchison, IV | ...... | H02J 7/0024 320/160 |
| 6,275,006 B1 * | 8/2001 | Koike | ................... | H02J 7/0071 320/152 |
| 6,346,794 B1 * | 2/2002 | Odaohhara | ........... | H02J 7/0025 320/116 |
| 6,744,234 B2 * | 6/2004 | Odaohhara | ........... | H02J 7/0048 320/100 |
| 6,768,286 B2 * | 7/2004 | Trembley | .............. | H02J 7/0048 320/121 |

(Continued)

OTHER PUBLICATIONS

"International Search Report and Written Opinion Issued in PCT Application No. PCT/US21/030027", dated Aug. 24, 2021, 11 Pages.

*Primary Examiner* — John T Trischler
(74) *Attorney, Agent, or Firm* — Holzer Patel Drennan

(57) ABSTRACT

In a computing device that includes multiple device sections, one or more rechargeable battery power sources can be placed in each device section. Not only does this approach provide valuable space for multiple batteries, but it can also present the option of powering each device section from any one or both of the battery power sources. However, using multiple battery power sources in a computing device can present challenges in effectively charging the battery power sources using an external power source. This technology adds an independent common charge controller that may bypass the charge circuits for each battery pack based on outputs from fuel gauges internal to each of the battery packs. This permits fast battery charging, while remaining within current and voltage limits that are dependent on the battery state of charge to preserve battery life.

20 Claims, 5 Drawing Sheets

(56) References Cited

U.S. PATENT DOCUMENTS

| | | | |
|---|---|---|---|
| 7,012,405 B2* | 3/2006 | Nishida | H02J 7/00714 320/137 |
| 7,274,171 B2* | 9/2007 | Nishida | H02J 7/0071 320/141 |
| RE40,223 E * | 4/2008 | Koike | H02J 7/0071 320/125 |
| 7,518,338 B2* | 4/2009 | Wang | H02J 7/0071 320/125 |
| 7,535,196 B2* | 5/2009 | Nagasawa | H02J 9/061 320/112 |
| 7,733,060 B2* | 6/2010 | Kojima | H02J 7/0032 324/427 |
| 7,786,698 B2* | 8/2010 | Felder | H02J 7/007182 320/128 |
| 8,030,902 B2* | 10/2011 | Kung | H01M 10/441 320/160 |
| 8,035,347 B2* | 10/2011 | Umetsu | H02J 7/0044 320/148 |
| 8,063,606 B2* | 11/2011 | Veselic | H02J 7/0013 320/124 |
| 8,148,950 B2* | 4/2012 | Matsuura | H02J 7/007194 320/132 |
| 8,183,837 B2* | 5/2012 | Iida | B60L 58/20 320/138 |
| 8,222,862 B2* | 7/2012 | Ichikawa | B60L 7/14 320/132 |
| 8,674,658 B2* | 3/2014 | Wang | H02J 7/0014 320/121 |
| 8,970,163 B2* | 3/2015 | Yun | H02J 7/00047 320/160 |
| 9,007,066 B2* | 4/2015 | Sufrin-Disler | B60L 58/22 324/433 |
| 9,184,615 B2* | 11/2015 | Kim | H02J 7/0036 |
| 9,229,064 B2* | 1/2016 | Chou | G01R 31/392 |
| 9,248,838 B2* | 2/2016 | Kusumi | B60W 10/26 |
| 9,331,498 B2* | 5/2016 | Albsmeier | H02J 7/1423 |
| 9,490,639 B2* | 11/2016 | Mercier | B60L 58/22 |
| 9,568,555 B2* | 2/2017 | Nortman | H01M 50/569 |
| 9,588,181 B2* | 3/2017 | Nortman | G01R 31/3835 |
| 9,590,436 B2* | 3/2017 | Sporck | H02J 7/00 |
| 9,594,415 B2* | 3/2017 | Obie | G06F 1/263 |
| 9,728,989 B2* | 8/2017 | Kim | H02J 7/02 |
| 9,800,064 B2* | 10/2017 | Hwang | H02J 7/342 |
| 9,917,458 B2* | 3/2018 | Lee | H02J 7/00712 |
| 10,014,695 B2* | 7/2018 | Crawley | H02J 7/0048 |
| 10,097,022 B2* | 10/2018 | Li | H02J 7/0047 |
| 10,135,277 B2* | 11/2018 | Heo | H02J 7/00 |
| 10,283,992 B2* | 5/2019 | Hsieh | H02J 7/0013 |
| 10,291,046 B2* | 5/2019 | Ravi | H02J 7/0069 |
| 10,291,051 B2* | 5/2019 | Pourdarvish | H02J 7/0071 |
| 10,317,983 B2* | 6/2019 | Obie | G06F 1/3296 |
| 10,396,582 B2* | 8/2019 | Yi | H02J 7/00718 |
| 10,416,238 B2* | 9/2019 | Nortman | H02J 7/0014 |
| 10,424,959 B2* | 9/2019 | Kim | H02J 7/0071 |
| 10,439,406 B2* | 10/2019 | Zhang | H02J 7/0013 |
| 10,447,054 B2* | 10/2019 | Christensen | G01R 31/392 |
| 10,547,196 B2* | 1/2020 | Jung | H02J 7/00714 |
| 10,551,894 B2* | 2/2020 | Li | G06F 1/3212 |
| 10,581,256 B2* | 3/2020 | Jung | H02J 7/00714 |
| 10,761,530 B2* | 9/2020 | Uppalapati | H02J 7/0029 |
| 10,823,785 B2* | 11/2020 | Ho | G01R 31/3835 |
| 10,875,418 B2* | 12/2020 | Ishida | B60L 53/24 |
| 10,919,403 B2* | 2/2021 | Ge | H02J 7/0024 |
| 10,921,377 B2* | 2/2021 | Ryotaro | G01R 15/08 |
| 10,971,941 B2* | 4/2021 | Krieg | H02J 7/0048 |
| 10,998,752 B2* | 5/2021 | Jung | H02J 7/00712 |
| 11,038,364 B2* | 6/2021 | Kristjansson | H02J 7/00714 |
| 11,050,285 B2* | 6/2021 | Jung | H02J 7/00712 |
| 11,121,560 B2* | 9/2021 | Singhal | H02J 7/00712 |
| 11,133,680 B2* | 9/2021 | Wang | H02J 7/0048 |
| 11,201,477 B2* | 12/2021 | Ohashi | H02J 1/082 |
| 11,239,680 B2* | 2/2022 | El Markhi | H02J 7/007192 |
| 11,251,638 B2* | 2/2022 | Chiu | H01M 10/48 |
| 11,296,518 B2* | 4/2022 | Park | H02J 7/02 |
| 11,404,887 B2* | 8/2022 | Fauteux | H01M 10/049 |
| 2003/0057922 A1* | 3/2003 | Odaohhara | H02J 7/0069 320/164 |
| 2004/0036445 A1* | 2/2004 | Trembley | H02J 7/0047 320/116 |
| 2004/0090209 A1* | 5/2004 | Nishida | H02J 7/007182 320/149 |
| 2004/0108835 A1* | 6/2004 | Kim | H02J 7/0013 320/125 |
| 2006/0087290 A1* | 4/2006 | Nishida | H02J 7/04 320/128 |
| 2007/0001646 A1* | 1/2007 | Kojima | H02J 7/0032 320/128 |
| 2007/0222420 A1* | 9/2007 | Nishida | H02J 7/04 320/162 |
| 2007/0247107 A1* | 10/2007 | Wang | H02J 7/0071 320/107 |
| 2008/0278119 A1* | 11/2008 | Veselic | H02J 7/04 320/161 |
| 2008/0309293 A1* | 12/2008 | Kung | H01M 10/441 320/160 |
| 2009/0027012 A1* | 1/2009 | Umetsu | H02J 7/0044 320/148 |
| 2009/0039831 A1* | 2/2009 | Ichikawa | B60L 58/15 320/118 |
| 2009/0153104 A1* | 6/2009 | Matsuura | H02J 7/007194 320/152 |
| 2009/0179612 A1* | 7/2009 | Sherman | G06F 1/263 320/114 |
| 2010/0033138 A1* | 2/2010 | Alger | H02J 7/0071 320/153 |
| 2010/0052624 A1* | 3/2010 | Li | H02J 7/00711 320/137 |
| 2010/0127669 A1* | 5/2010 | Iida | H02J 7/0019 320/137 |
| 2010/0237832 A1* | 9/2010 | Mack | H01M 10/0525 320/160 |
| 2011/0204853 A1* | 8/2011 | Shimayama | H01M 10/441 320/162 |
| 2012/0105001 A1* | 5/2012 | Gallegos | H01M 10/441 320/109 |
| 2012/0112703 A1* | 5/2012 | Xu | H02J 7/0013 320/145 |
| 2012/0139495 A1* | 6/2012 | Nortman | G01R 31/382 320/128 |
| 2012/0139549 A1* | 6/2012 | Sufrin-Disler | H01M 10/48 324/433 |
| 2012/0139553 A1* | 6/2012 | Nortman | G01R 31/396 324/126 |
| 2012/0161708 A1* | 6/2012 | Miura | B60L 58/14 903/903 |
| 2012/0187909 A1* | 7/2012 | Nysen | H01M 10/425 320/118 |
| 2014/0062387 A1* | 3/2014 | Kim | H02J 7/0036 320/137 |
| 2014/0070760 A1* | 3/2014 | Albsmeier | H02J 7/342 320/107 |
| 2014/0117934 A1* | 5/2014 | Kurikuma | H02J 5/00 320/109 |
| 2014/0203780 A1* | 7/2014 | Hu | H02J 7/0013 320/112 |
| 2014/0347003 A1* | 11/2014 | Sporck | H02J 1/102 320/107 |
| 2014/0361732 A1* | 12/2014 | Nishikawa | H02J 7/00 320/107 |
| 2015/0089248 A1* | 3/2015 | Obie | G06F 1/3296 713/300 |
| 2015/0198671 A1* | 7/2015 | Nortman | H02J 7/0016 324/426 |
| 2015/0200552 A1* | 7/2015 | Nortman | G01R 31/382 320/134 |
| 2015/0214755 A1* | 7/2015 | Crawley | H02J 7/0068 320/112 |
| 2015/0357859 A1* | 12/2015 | Pourdarvish | H02J 7/00712 320/159 |

(56) References Cited

U.S. PATENT DOCUMENTS

| | | | |
|---|---|---|---|
| 2016/0064967 A1* | 3/2016 | Lee | H02J 7/00712 320/112 |
| 2016/0114692 A1* | 4/2016 | Tripathi | B60L 53/11 320/109 |
| 2016/0226269 A1* | 8/2016 | Hwang | B60L 3/0046 |
| 2016/0248266 A1* | 8/2016 | Ferrese | H02J 7/0013 |
| 2017/0040821 A1* | 2/2017 | Li | H02J 7/00036 |
| 2017/0063123 A1* | 3/2017 | Horie | H02J 7/00712 |
| 2017/0104359 A1* | 4/2017 | Jung | H02J 50/10 |
| 2017/0160790 A1* | 6/2017 | Obie | G06F 1/3296 |
| 2017/0256973 A1* | 9/2017 | Kim | H02J 7/0071 |
| 2017/0264125 A1* | 9/2017 | Hsieh | H02J 7/0068 |
| 2017/0271887 A1* | 9/2017 | Heo | H02J 7/007 |
| 2017/0338666 A1* | 11/2017 | Christensen | H01M 10/48 |
| 2017/0343610 A1* | 11/2017 | Ho | G01R 31/367 |
| 2018/0205241 A1* | 7/2018 | Zhang | H02J 7/0013 |
| 2018/0262027 A1* | 9/2018 | Jung | H01M 10/4285 |
| 2019/0214837 A1* | 7/2019 | Kristjansson | H02J 7/0013 |
| 2019/0222051 A1* | 7/2019 | Pourdarvish | H01M 10/44 |
| 2019/0372358 A1* | 12/2019 | El Markhi | H02J 7/00304 |
| 2020/0076223 A1* | 3/2020 | Kuriki | H01M 10/46 |
| 2020/0112178 A1* | 4/2020 | Jung | H02J 7/00714 |
| 2020/0119562 A1* | 4/2020 | Jung | H02J 7/00712 |
| 2020/0203956 A1* | 6/2020 | Chiu | H02J 7/007 |
| 2020/0220364 A1* | 7/2020 | Wang | H02J 7/0014 |
| 2020/0274370 A1* | 8/2020 | Krieg | B60L 53/122 |
| 2020/0313446 A1* | 10/2020 | Park | H02J 7/0042 |
| 2020/0317084 A1* | 10/2020 | Schaffer | B60L 50/00 |
| 2021/0096633 A1* | 4/2021 | Rintamaeki | G05B 17/02 |
| 2021/0099002 A1* | 4/2021 | Banerjee | G06F 1/28 |
| 2021/0135478 A1* | 5/2021 | Schline | G06F 1/3212 |
| 2021/0296914 A1* | 9/2021 | Bourilkov | H02J 7/00712 |
| 2021/0296917 A1* | 9/2021 | Bourilkov | G06F 1/263 |
| 2021/0296919 A1* | 9/2021 | Liu | H01M 10/46 |
| 2021/0320504 A1* | 10/2021 | Choi | H02J 7/0047 |
| 2021/0351446 A1* | 11/2021 | Zhu | H02J 7/00714 |
| 2021/0399568 A1* | 12/2021 | Huang | G06F 3/0482 |
| 2022/0060033 A1* | 2/2022 | Bang | H02J 7/0048 |
| 2022/0060038 A1* | 2/2022 | Zhang | H02J 7/00036 |
| 2022/0077693 A1* | 3/2022 | Justin | H02J 7/0048 |
| 2022/0077695 A1* | 3/2022 | Choi | H02J 7/0016 |
| 2022/0115889 A1* | 4/2022 | El Markhi | H02J 7/00712 |
| 2022/0263317 A1* | 8/2022 | Diamond | H02J 3/32 |
| 2022/0385080 A1* | 12/2022 | Bijlenga | H02J 7/0024 |
| 2022/0393485 A1* | 12/2022 | Kamel Ahmed | H01M 50/204 |
| 2022/0416563 A1* | 12/2022 | Nakagawa | H02J 7/00712 |

\* cited by examiner

COMMON CHARGE CONTROLLER FOR ELECTRONIC DEVICES WITH MULTIPLE BATTERIES

BACKGROUND

Modern computing and/or electronic devices often rely on rechargeable battery power sources to provide mobile computing functionality. Some mobile computing devices, such as laptop computers, also support various physical configurations (e.g., a foldable computing device with two or more device sections). Such physical designs present opportunities and challenges for battery pack placement, charging ports and circuitry, protection circuitry, charging/discharging operation, and other design factors.

SUMMARY

The described technology provides an electronic device comprising a first device section including a first battery power source, the first battery power source including a first internal fuel gauge. The electronic device further comprises a second device section including a second battery power source, the second battery power source including a second internal fuel gauge. The electronic device still further comprises a first charge circuit to selectively direct power from an external power source to one or both of the first and the second battery power sources according to a first charging phase, the first charge circuit selecting the first charging phase based on a composite state of charge of the first and the second battery power sources detected at the first charge circuit residing above an activation threshold. The electronic device further still comprises a common charge controller to override the first charging phase of the first charge circuit based on an output from one of the first and the second internal fuel gauges residing below the activation threshold.

The described technology further provides a method of controlling a transition between charging phases of an electronic device. The method comprises detecting a composite state of charge of a first battery power source within a first device section and a second battery power source within a second device section of the electronic device. The method further comprises selecting a first charging phase for a first charge circuit to selectively direct power from an external power source to one or both of the first and the second battery power sources based on the detected composite state of charge residing above an activation threshold. The method still further comprises detecting a state of charge of the first battery power source at a first fuel gauge internal to the first battery power source and detecting a state of charge of the second battery power source at a second fuel gauge internal to the second battery power source. The method further still comprises overriding the first charging phase of the first charge circuit based on an output from one of the first and the second internal fuel gauges residing below the activation threshold.

Other implementations are also described and recited herein.

BRIEF DESCRIPTIONS OF THE DRAWINGS

DETAILED DESCRIPTIONS

Figure 1:
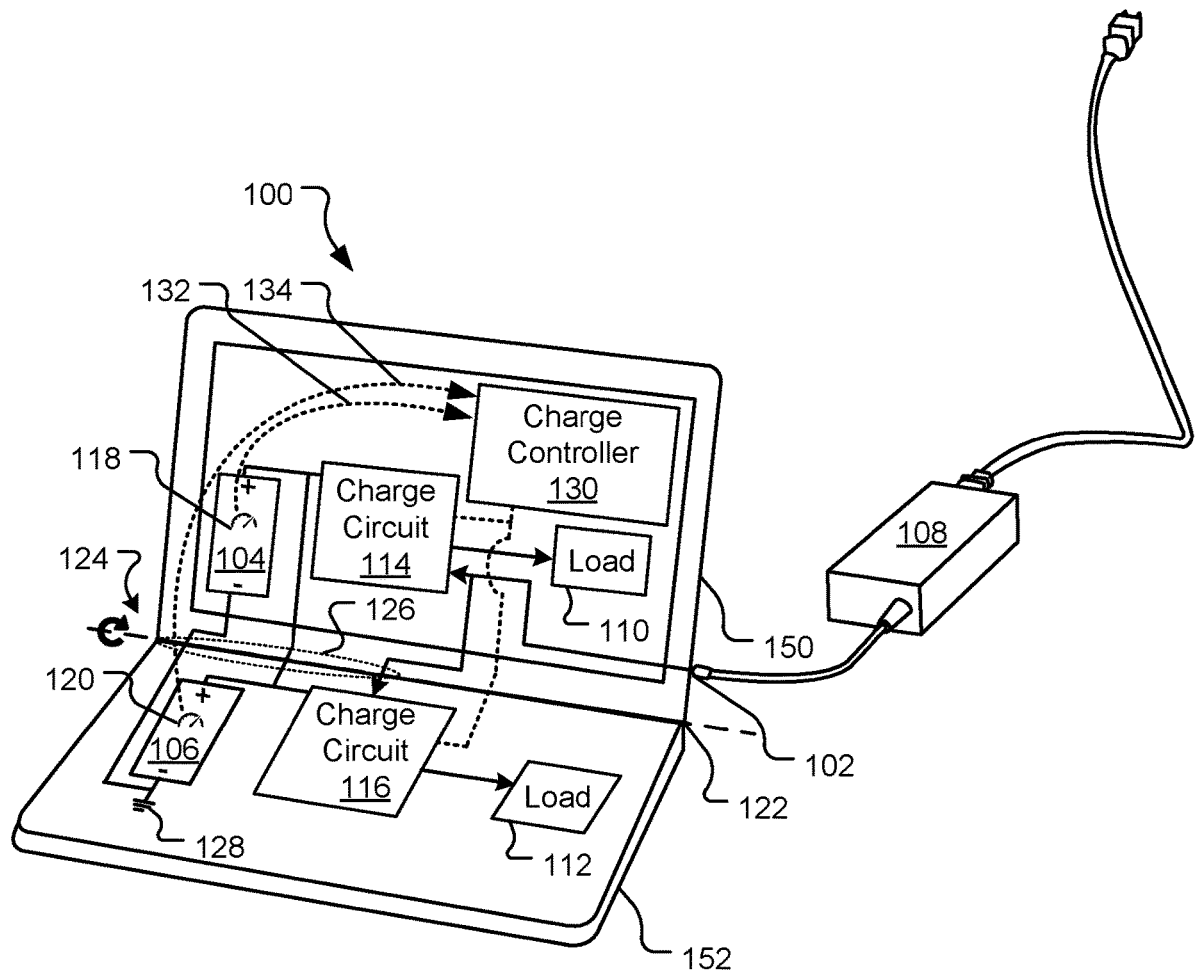
FIG. 1 illustrates an example electronic device having a common charge controller and two device sections, each with respective battery packs and charge circuits.

In a computing and/or electronic device that includes multiple device sections (e.g., a keyboard section and a display section, two display sections, and so on), one or more rechargeable battery power sources (also referred to herein as battery packs or batteries) can be placed in each device section. While the following disclosure describes implementations that have two device sections, each with one corresponding battery pack with specificity, it is contemplated herein that an electronic and/or computing device according to the presently disclosed technology may similarly operate with two or more device sections, each with one or more battery packs.

Not only does this approach provide valuable space for multiple batteries, but it can also present the option of powering each device section from any one or both of the battery power sources. Including multiple battery power sources in an electronic computing device is also a way to extend run-time capacity by providing a larger overall storage capacity than that of a single battery power source. However, using multiple battery power sources in a computing device can present challenges in effectively charging the battery power sources using an external power source.

Some computing devices that includes multiple device sections incorporate a charge circuit for each battery pack within each device section, which creates redundant charging systems. The presently disclosed technology maintains redundant charging systems but adds an independent common charge controller that may bypass the charge circuits for each battery pack based on outputs from fuel gauges internal to each of the battery packs.

As many consumer electronics include power demanding technologies such as high processing power, dual displays, and multiple sensors; a great deal of power and the resulting heat dissipation is required and may vary between device sections. Further, consumer electronics are now generally expected to include a fast charging capability (e.g., a 0-80% state of charge within 30 minutes). Still further complicating is that the battery packs in different device sections may have significantly different states of charge (e.g., 10% charged and 40% charged, for example), as well as battery temperatures (e.g., 0° C. and 50° C., for example), both of which are changing over time. Further still, various batteries may have an upper temperature limit to maintain battery life.

To achieve a fast charging capability, while generally preserving battery life, battery charging now may be separated into different phases depending on the state of charge of a battery. Further, how the different phases are defined is dependent on the battery type (e.g., lithium ion (Li-ion)) and battery specifications. For example, Li-ion battery charging may be separated into pre-charge, fast-charge, and end-of-charge phases. Modern charger integrated circuits (ICs) include a finite state machine (FSM) logic that directs the charger to operate in one of the charging phases based on the corresponding battery state-of-charge, and the battery temperature. This permits fast battery charging, while remaining within current and voltage limits that are dependent on the battery state of charge and temperature to preserve battery life. Notably, the maximum allowed charge current is drastically different between the pre-charge and the fast-charge phases, so it is important for the charger integrated circuit (IC) to accurately determine the battery state-of-charge to prevent a premature transition from pre-charge to the fast-charge phase within a charge cycle. Typically, the charger IC is used to measure a corresponding battery voltage thereby defining a transition from one charging phase to another charging phase. Similarly, in a computing device that includes multiple device sections, the charger IC within either device section is used to measure a combined battery voltage thereby defining a transition from one charging phase to another charging phase.

In many implementations, it is difficult to maintain the fast-charge phase, particularly at higher temperatures, as the charging operation itself generates additional heat. As a result, charging may be throttled based on a temperature limit on the batteries and/or charge circuits. As it is likely temperature conditions within one section may differ substantially from that of another section, the charge circuit within the cooler section may be leveraged to do a bulk of the charging of the battery in both device sections. However, providing an accurate view of the actual state of charge of each battery is important to prevent inadvertently exceeding each battery's state-of-charge dependent charging current limitations.

FIG. 1 illustrates an example electronic device 100 having a common charge controller 130 and two device sections 150, 152, each with respective battery packs 104, 106 and charge circuits 114, 116. The example electronic device 100 includes a distributed battery architecture that supports simultaneous charging and/or discharging of the battery packs 104, 106. The electronic device 100 is shown to be a foldable mobile computing device in FIG. 1 but may be any battery-powered electronic device.

The electronic device 100 includes system loads 110, 112, each of which may include system electronics (e.g., a processor, memory, display, speakers, wireless circuitry) or other system loads supported by current from the battery packs 104, 106 through their respective charge circuits 114, 116. Further, each of the battery packs 104, 106 may include one or more individual battery cells, each of which may be electrically arranged in series or parallel depending on the cell characteristics and output needs of the battery packs 104, 106. Both the device sections 150, 152 may include their own system loads 110, 112, respectively, as shown.

The two battery packs 104, 106 are rechargeable through a single charging node 102 when connected to an external power source, such as to charger 108 plugged into an outlet or other external power source (not shown). In at least one implementation, the first battery pack 104 and the second battery pack 106 are also rechargeable in the sense they may rebalance within one another without external power connected, if the system loads are light. Also, the battery packs 104, 106 may be dischargeable in the sense that their relative discharge rates to the system loads 110, 112 are balanced between the two battery packs 104, 106.

In various implementations, the battery packs 104, 106 may vary in relative capacities, outputs, charge profiles, positions, and connections within the electronic device 100 (e.g., battery pack 104 may include a single 4.4V battery cell and battery pack 106 may include two 4.4V battery cells, connected in series or parallel). Other combinations of battery packs having different numbers of individual cells, associated voltages, and disparate charge/discharge profiles may also be employed. Such battery packs are referred to herein as disparate or having disparate power storage characteristics that may lead to different relative states of charge within the electronic device 100.

Each of the battery packs 104, 106 includes integral state of charge monitor and protection circuitry (also referred to as gas gauges or a fuel gauges) 118, 120, respectively. The integral battery state of charge function monitors the level of remaining capacity in a battery. The battery protection function detects a variety of fault conditions, such as over-voltage, under-voltage, over-temperature, discharge over-current, and short-circuiting within a battery. In some implementations, the fuel gauges 118, 120 omit the battery protection function.

Each of the fuel gauges 118, 120 directly communicate a state of charge for their respective battery packs 104, 106 to the charge controller 130, as illustrated by dotted lines 132, 134, respectively. The charge controller 130 is a firmware-based controller with the capability of overriding a charging phase choice made by one or both of the charge circuits 114, 116. While the charge circuits 114, 116 make their choice of charging phase based on a combined battery state-of-charge measured at the charge circuits 114, 116, the charge controller 130 makes a choice based on the fuel gauges 118, 120, each output separately and directly to the charge controller 130. Accordingly, the charge controller 130 makes choice of charging phase based on separate state-of-charge measurements of the battery packs 104, 106.

The device sections 150, 152 fold relative to one another at central hinged portion (or boundary) 122, as illustrated by arrow and axis 124. Other movable boundaries between the device sections 150, 152 may also be employed, including a boundary in which the device sections 150, 152 slide with respect to one another and a flexible boundary. In various implementations, the device section boundary is re-configurable in that it's physical orientation may change over time. Hinge wiring 126 extends through the central hinged portion 122 to 1) couple the battery packs 104, 106 to a common ground 128, 2) couple the outputs from each of the charge circuits 114, 116 for load management and battery state-of-charge balancing purposes, 3) couple the charging node 102 to an input of the charge circuits 116, and 4) communicate an output from the fuel gauge 120 of the battery pack 106 to the charge controller 130.

Various components of FIG. 1 are generally hidden from view within the computing device 100 but are illustrated for clarity. Additional details of the computing device 100 of FIG. 1 may be as described elsewhere herein, including below with reference to circuit 200 of FIG. 2.

Figure 2:
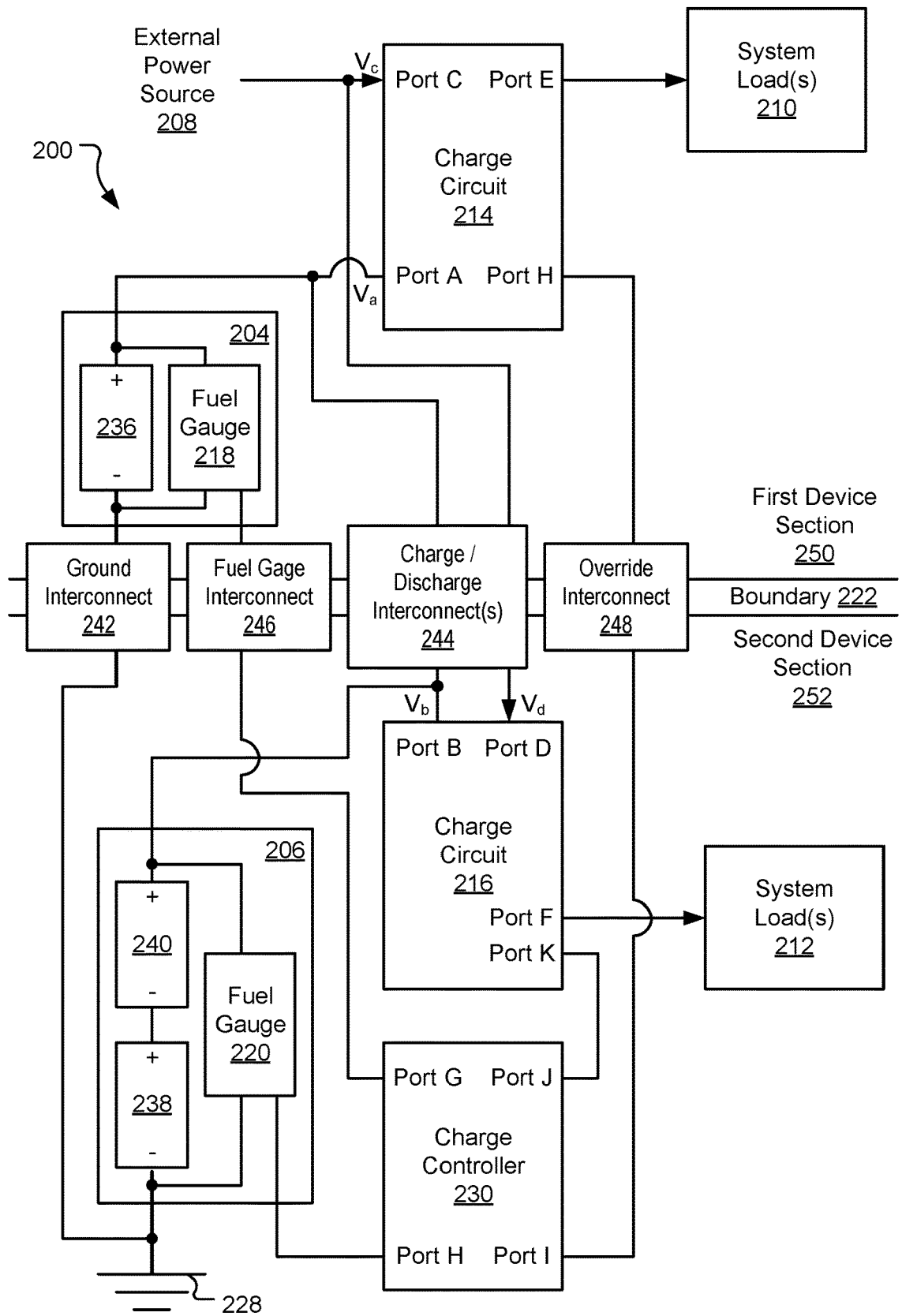
FIG. 2 illustrates an example schematic of a circuit diagram for a common charge controller.

FIG. 2 illustrates an example circuit diagram schematic 200 for a common charge controller 230. The schematic 200 is specifically for an electronic device (not shown, see e.g., computing device 100 of FIG. 1) having two device sections 250, 252, each with respective battery packs 204, 206 and charge circuits 214, 216. Further implementations with additional device sections with one or more battery packs, or additional battery packs within each of the device sections 250, 252 are contemplated herein. The two device sections 250, 252 are divided by a device section boundary 222, which may include a foldable or slidable interconnection. The battery packs 204, 206 and their respective charge circuits 214, 216 are configured to supply power to system load(s) 210, 212.

Battery pack 204 includes a singular battery cell 236, while battery pack 206 includes a pair of battery cells 238, 240 connected in series. In an example implementation, the battery cells 236, 238, 240 are cobalt based li-ion battery cells, each having a nominal cell voltage of 3.6 volts, a discharge voltage of 2.8-3.0 volts and a maximum charge voltage of 4.2 volts. As the battery cells 238, 240 are connected in series, the battery pack 206 voltage is additive, resulting in a nominal cell voltage of 7.2 volts, a discharge voltage of 5.6-6.0 volts, and a maximum charge voltage of 8.2 volts, for example.

Other types of battery cells, nominal voltages, and charge capacities may also be employed. The battery packs 204, 206 may present disparate voltages and charge capacities (e.g., the two series battery cells 238, 240 of the battery pack 206 present approximately twice the voltage level of the single battery cell 236 of the battery pack 204). Other disparate battery pack pairings may also be used in any implementation disclosed herein. The battery packs 204, 206 are commonly grounded across a ground interconnect 242 that leads to a chassis ground 228 that may be generally located within either or both of the two device sections 250, 252.

Charge circuit 214 monitors the state of charge of the battery packs 204, 206 by monitoring discharge voltage $V_a$ at port A. $V_a$ generally represents voltage of the battery battery packs 204, 206 as measured at the charge circuit 214. Charge circuit 216 monitors the state of charge of the battery packs 204, 206 by monitoring discharge voltage $V_b$ at port B. $V_b$ generally represents voltage of the battery packs 204, 206 as measured at the charge circuit 216. Both $V_a$ and $V_b$ are composite state of charge measurements of both of the battery packs 204, 206, however, the measurements will vary based on the different locations of the charge circuit 214, 216 within the electronic device. The charge circuits 214, 216 use the measured voltages $V_a$, $V_b$ to estimate a composite state of charge of the battery packs 204, 206, using a predefined relationship between voltage and state of charge for the battery packs 204, 206. In various implementations, the charge circuits 214, 216 each include a pair of field-effect transistors (FETs) controlled by a charge controller specific to each of the charge circuits 214, 216.

The discharge paths from the battery packs 204, 206 are connected via a charge/discharge interconnect 244. While this architecture permits one or both of the charge circuits 214, 216 to charge one or both of the battery packs 204, 206, and receive power from one or the battery packs 204, 206, the charge/discharge interconnect 244 prevents the charge circuits 214, 216 from accurately distinguishing between the state of charge of each of the battery packs 204, 206.

$V_c$, $V_d$ represents supply voltage of external power source 208, which may range from 2-20 v, but may be regulated to a point at or below a maximum charge voltage of the battery packs 204, 206 (e.g., at or below 13V). The external power source 208 may be connected to one of the charge circuits 214, 216 (here, charge circuit 214), and then supplied to the other of the charge circuits 214, 216 (here, charge circuit 216) via the charge/discharge interconnect 244. $V_c$ is monitored at Port C of the charge circuit 214 and $V_d$ is monitored at Port D of the charge circuit 216. One or both of the charge circuits 214, 216 charge and/or discharge one or both battery packs 204, 206 based on the estimated state of charge of the battery packs 204, 206 (from $V_a$, $V_b$), the presence or lack thereof of the external power source 208 (from $V_a$), and the power draw from the system load(s) 210, 212 at Ports E, F of charge circuits 214, 216, respectively. The charge circuits 214, 216 may also include protection circuitry to disconnect the battery packs 204, 206 if a fault is detected.

Each of the battery packs 204, 206 includes integral state of charge monitor and protection circuitry (also referred to as gas gauges or a fuel gauges) 218, 220, respectively. The fuel gauges 218, 220 provide a generally more accurate reading of the battery state of charge as they are internal to the battery packs 204, 206, rather than an external reading at the charge circuits 214, 216 (from $V_a$, $V_b$), after a crossover at the charge/discharge interconnect 244.

Each of the fuel gauges 218, 220 directly communicate a state of charge for their respective battery packs 204, 206 to the charge controller 230 at Ports G and H, respectively. As the charge controller 230 is located in one of the one of the device sections 250, 252 (here, device section 252), the output from the fuel gauge 218 is supplied from the device section 250 across the boundary 222 at a fuel gauge interconnect 246.

The common charge controller 230 is a firmware-based controller with the capability of overriding a charging phase choice made by one or both of the charge circuits 214, 216. While the charge circuits 214, 216 make their choice of charging phase based on the composite battery state-of-charge measured at the charge circuits 214, 216, the charge controller 230 makes a choice based on the fuel gauges 218, 220, each output separately and directly to the charge controller 230. Accordingly, the charge controller 230 makes choice of charging phase based on state-of-charge measurements that are generally more accurate as to each of the battery packs 204, 206.

The common charge controller 230 at Ports I, J outputs a signal to each of the charge circuits 214, 216 at Ports H, K, respectively. The signal may override a charging state otherwise determined by the charge circuits 214, 216 if the charge controller 230 determines one or both of the battery packs 204, 206 are not at an appropriate state-of-charge for the charging state chosen by one or both of the charge circuits 214, 216. As the charge controller 230 is located in device section 252, the output from the charge controller 230 to the charge circuit 214 is supplied from the device section 252 across the boundary 222 at an override interconnect 248.

In an example implementation, the common charge controller 230 is able to query the fuel gauges 218, 220 via an inter-integrated circuit (I2C) or other data connection. Should the common charge controller 230 override the charge circuits 214, 216, it may send a signal that bypasses the FETs located in the power path of the charge circuits 214, 216 to unconditionally execute the override. In one example implementation, the common charge controller 230 is primarily used to block a premature transition from a pre-charge phase to a fast-charge phase. If the charge circuits 214, 216 allow blocking of the transition programmatically (e.g., via register writes over I2C), the override command may be programmed as described logically herein.

If the charge circuits 214, 216 do not allow blocking of the transition programmatically, the pre-charge current may be programmed into the fast-charge control register at the charge circuits 214, 216. In other words, the common charge controller 230 may substitute a lower current than that normally associated with the fast-charge phase in registers for the fast-charge phase stored at the charge circuits 214, 216. Even if the charge circuits 214, 216 execute a premature transition into fast-charge phase, the charge circuits 214, 216 would only push the pre-charge current, thus protecting the battery packs 204, 206. Once the common charge controller 230 firmware verifies that both the battery packs 204, 206 are above an activation voltage threshold, the common charge controller 230 may release the hold (e.g., by releasing the programmed command or changing the fast-charge control register back to the fast-charge current) and begin the fast-charge phase.

Additional details of schematic 200 of FIG. 2 may be as described elsewhere herein, including above with reference to computing device 100 of FIG. 1.

Figure 3:
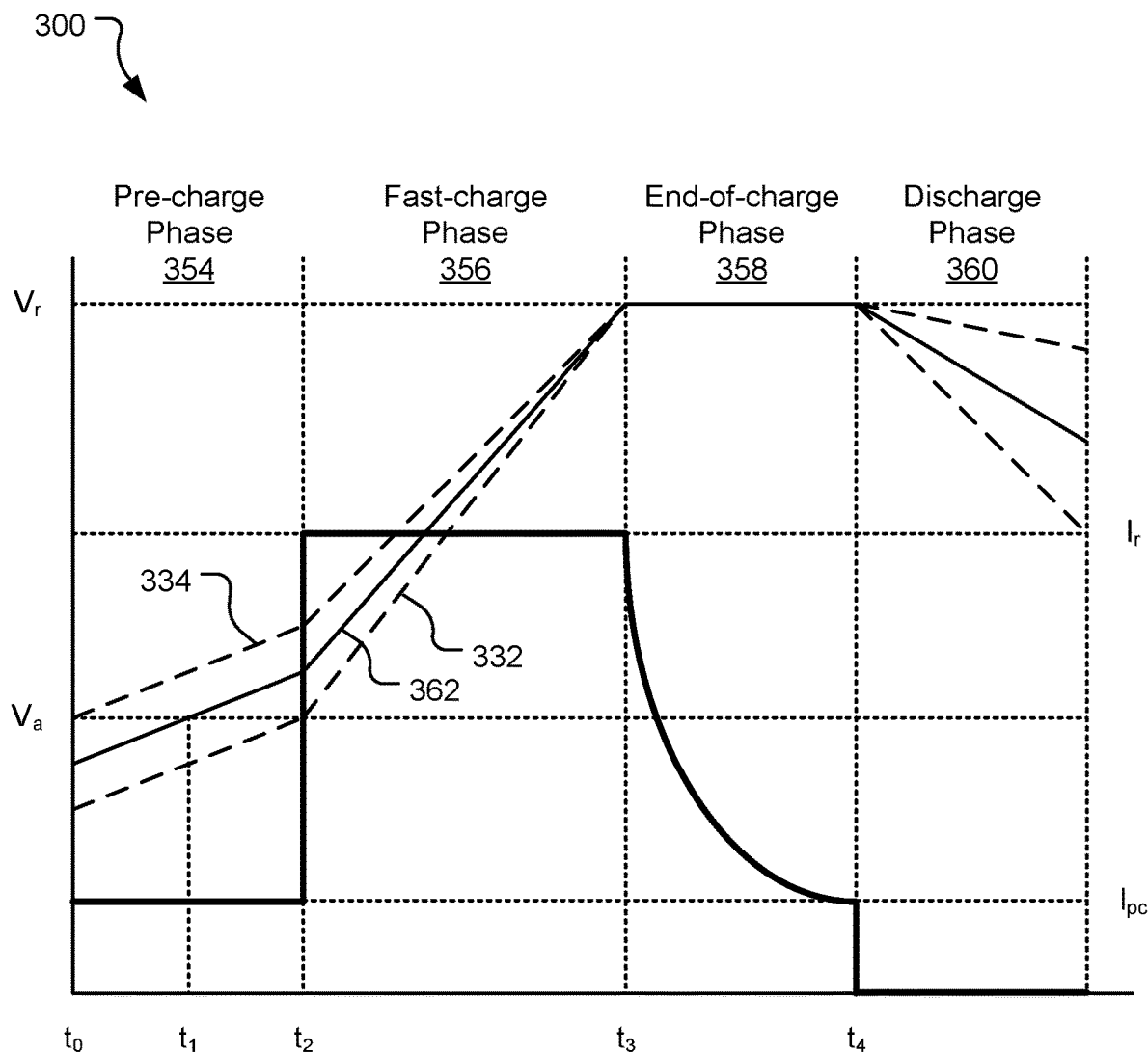
FIG. 3 is a graph of battery charger operation against state-of-charge for a pair of battery packs.

FIG. 3 is a graph 300 of battery charger operation against state-of-charge for a pair of battery packs. The graph 300 illustrates four distinct phases of operation. When a battery is fully or nearly-fully discharged, the battery charger first charges the battery with a low constant current (illustrated as $I_{pc}$) to slowly reactivate the battery. Application of this low constant current is referred to herein as a pre-charge phase 354. More specifically, the battery is charged at a low rate (e.g., 10%-20% of the battery's rated charging current capacity) when the battery voltage is below an activation threshold (illustrated as $V_a$, e.g., 3.0 volts). The pre-charge phase 354 allows for gradual recovery of the passivating layer, which might be dissolved after prolonged storage in fully or nearly-fully discharged state. Further, the pre-charge phase 354 also reduces the likelihood of overheating at the battery's rated charging current capacity when partial copper decomposition appears on anode-shorted cells when the battery is fully discharged.

When the battery cell voltage reaches its activation threshold ($V_a$), the charger will increase the current to a high constant current (illustrated as $I_r$) thereby rapidly increasing the voltage of the battery. Application of this high constant current ($I_r$) is referred to herein as a fast-charge phase 356, which is the main charging phase for the battery. In various implementations, the fast-charge phase 356 charges the battery between 10%-20% and 80% of the battery's capacity at the fastest rate permissible for the battery. Like the pre-charge phase 354, the fast-charge phase 356 operates at a constant current but is set at a much higher level. The current is held constant against the rising internal resistance to charge current by raising the battery voltage.

The battery may be charged at the high constant current of the fast-charge phase 356 until the battery voltage reaches its regulation voltage (illustrated as e.g., 4.1-4.2 volts), which depending on the battery's electrochemistry, may be approximately 80% of the battery's rated capacity. When the battery voltage reaches the regulation voltage ($V_r$), the charger switches to an end-of-charge phase 358 to prevent overcharging the battery. In the end-of-charge phase 358, the battery's voltage is held constant at its regulation voltage ($V_r$), while allowing current to drop to charge the remaining approximately 20% of the battery's rated capacity. In various implementations, the current drops gradually to maintain the constant voltage on the battery during the end-of-charge phase 358, as illustrated.

Maintaining the constant regulation voltage ($V_r$) gradually reduces the current until it reaches low end-of-charge threshold, which is illustrated as the same as the low constant current ($I_{pc}$), at which point charging is terminated. In other implementations the low end-of-charge current threshold may differ from the low constant current ($I_{pc}$). If the charger is left connected to the battery, a periodic top-up charging phase (not shown) is applied to counteract battery self-discharge. If the battery is used to power an electronic device, the battery is considered to be in a discharge phase 360, where power is consumed from the battery and the voltage at the battery drops over time indicating depletion of the battery's state-of-charge.

While the foregoing describes the charging phases of a singular battery, the charging phases similarly apply to a pair of interconnected batteries, each of which are illustrated by dashed lines 332, 334 of graph 300. A solid line 362 illustrates a composite measurement of both of the interconnected batteries, which lies between (but not necessarily at the median) the measured state-of-charge of each of the pair of interconnected batteries, as shown.

In various implementations, the pair of interconnected batteries represented by the dashed lines 332, 334 are that of an electronic device having a common charge controller and two device sections, each with a respective one of the batteries (or battery packs) and a charge circuit, as discussed in detail above with reference to FIGS. 1 and 2 (see e.g., battery packs 204, 206 and charge circuits 214, 216 of FIG. 2). The composite measurement of both of the interconnected batteries represented by the solid line 362 is that measured at one or both of the respective charge circuits of the interconnected batteries. The state-of-charge of each of the pair of interconnected batteries represented by the dashed lines 332, 334 is that measured at respective fuel gauges within each battery, which is communicated to a charge controller common to both of the interconnected batteries.

At time $t_0$, the batteries are substantially depleted, but an external power source has been connected to the batteries to raise their state of charge. One or both of the charge circuits associated with the batteries detects the output voltage of the batteries as being below activation threshold ($V_a$), thus the charge circuit(s) apply the low constant current ($I_{pc}$) of the pre-charge phase 354 to begin charging the batteries.

At time $t_1$, the charge circuit(s) detect that the output voltage of the batteries has met the activation threshold ($V_a$), and thus the switches the charging state to the high constant current ($I_r$) of fast-charge phase 356. In prior art systems, if the batteries are at a substantially different state of charge, this would result in one of the batteries being prematurely charged at the high constant current, which may damage that battery over time. In the presently disclosed technology, the common charge controller monitors the state of charge of each of the batteries via their respective fuel gauges, which results in more accurate state of charge readings for each battery. If the common charge controller determines that one of the batteries has not yet reached $V_a$, even though the composite measurement of both of the interconnected batteries as measured by the charge circuit(s) has reached $V_a$, the common charge controller can override the charge circuit(s) and maintain the pre-charge phase 354 until both of the batteries have reached $V_a$.

At time $t_2$, the common charge controller has determined that both of the batteries have reached $V_a$ and thus releases its override on the charge circuit(s). As a result, the charge circuit(s) switch the charging state to the fast charge phase 356, which is maintained until the batteries reach their constant regulation voltage ($V_r$). At time $t_3$, which is when the batteries reach $V_r$, the charge circuit(s) switch the charging state to the end-of-charge phase 358, which completes the battery charge by maintaining $V_r$ with a gradually decreasing charging current down to $I_{pc}$. At time $t_4$, as $I_{pc}$ is reached, charging of the batteries is considered complete and the charging current drops to 0. Also at time $t_4$ (or earlier or later in time), the batteries may enter the discharge phase 360, which in various implementations, may overlap with one or more of the charging phases 354, 356, 358. The discharge phase 360 may disproportionately discharge the batteries due to disparate power demands of an associated electronic device on each of the batteries. As a result, the state of charge of each of the batteries may again substantially diverge, as shown.

While the charging phases 354, 356, 358 described herein are typical of li-ion batteries, similar charging phases may also be used to charge different battery types. Further, different charging phases may be used to charge a different battery type, including the override capability of the common charge controller as described above on one or more of the different charging phases.

Figure 4:
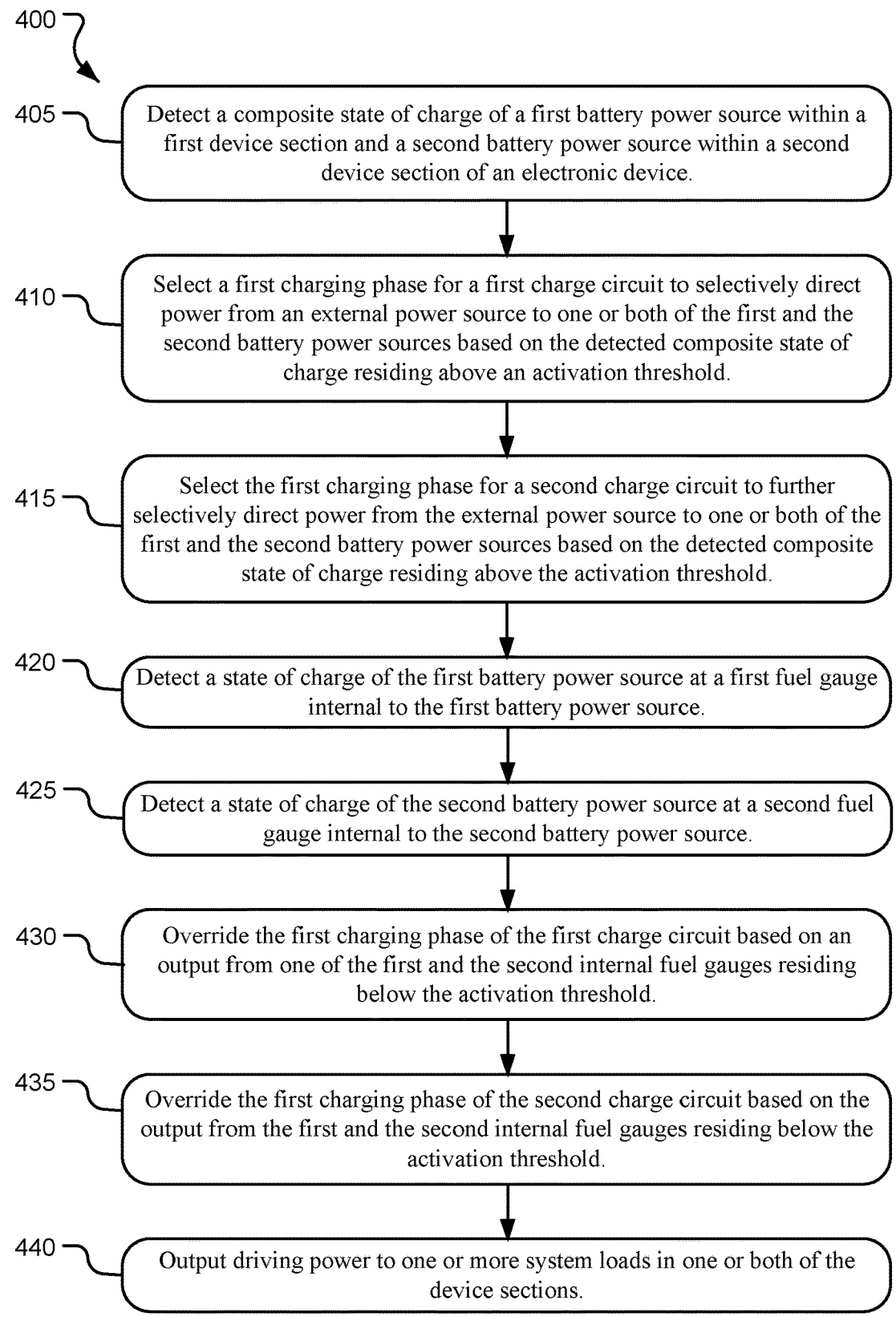
FIG. 4 illustrates example operations for controlling a transition between charging phases of an electronic device.

FIG. 4 illustrates example operations 400 for controlling a transition between charging phases of an electronic device. The device includes multiple reconfigurable sections (e.g., a sliding or folding device), each including a battery power source and an associated charge circuit.

A first detecting operation 405 detects a composite state of charge of a first battery power source within a first device section and a second battery power source within a second device section of the electronic device. The outputs of the first and second battery power sources are electrically connected in order to permit one or both of the battery power sources to provide power to electronic components within one or both of the first and second device sections. Accordingly, the state of charge measurement of the electrically connected outputs of the first and second battery power sources is naturally a composite measurement of both of the first and second battery power sources. While the state of charge measurement is a composite measurement (i.e., a value between the two measurements defined by a mathematic relationship that includes but is not limited to an arithmetic mean of the two measurements), it is not necessarily an average (i.e., an estimation of or approximation to an arithmetic mean of the two measurements) as the measurement may take place at a charge circuit with a lower impedance path to one of the battery power sources as compared to the other charge circuit. However, if the impedance paths are substantially the same, the composite measurement may be an average or estimation of or approximation to an arithmetic mean state of charge of the first and second battery power sources.

A first selecting operation 410 selects a first charging phase for a first charge circuit to selectively direct power from an external power source to one or both of the first and the second battery power sources based on the detected composite state of charge residing above an activation threshold. The first charge circuit selects the charging phase from two or more options (e.g., a pre-charge phase, a fast-charge phase, and an end-of-charge phase), each of which has a range of applicability based on the detected composite state of charge. For example, during a charging operation of a first battery power source with a low state of charge, moving from a pre-charge phase to a fast-charge phase is signaled by the battery voltage exceeding the activation voltage for the first battery power source.

A second selecting operation 415 selects the first charging phase for a second charge circuit to further selectively direct power from the external power source to one or both of the first and the second battery power sources based on the detected composite state of charge residing above the activation threshold. For example, similar to the first battery power source, during a charging operation of a second battery power source with a low state of charge, moving from a pre-charge phase to a fast-charge phase is signaled by the battery voltage exceeding the activation voltage for the second battery power source. In many implementations, the charging phase for both the first and the second battery power sources selected by their respective charge circuits is the same due to a similar composite measurement of both of the first and second battery power sources at their respective charge circuits.

A second detecting operation 420 detects a state of charge of the first battery power source at a first fuel gauge internal to the first battery power source. The first fuel gauge yields a more accurate measurement of the state of charge of exclusively the first battery power source, with no, little, or less influence by the still electrically interconnected second battery power source. This is due to the first fuel gauge being internal to the first battery power source and thus much closer both physically and electrically to the first battery power source as compared to the second battery power source. A third detecting operation 425 detects a state of charge of the second battery power source at a second fuel gauge internal to the second battery power source. Similar to the first fuel gauge, the second fuel gauge yields a more accurate measurement of the state of charge of exclusively the second battery power source, with no, little, or less influence by the still electrically interconnected first battery power source.

A first overriding operation 430 overrides the first charging phase of the first charge circuit based on an output from one of the first and the second internal fuel gauges residing below the activation threshold. The first overriding operation 430 is performed by a common charge controller that is located in one of the device sections, although it provides an overriding control of charge circuits in each device section. In one example implementation, the common charge controller receives outputs from the first and second fuel gauges and determines if either of the first and second battery power sources is below the activation voltage, even if the composite voltage measurement indicates that the first and second battery power sources are as a whole above the activation voltage. If one of the battery power sources remains below the activation voltage, the common charge controller sends an override command to be executed at the first charge circuit to maintain the pre-charge phase regardless of the composite state of charge measurement taken at the first charge circuit. Once both the first and second battery power sources exceed the activation voltage as indicated by the first and second fuel gauges, respectively, the common charge controller may release its override command on the first charge circuit. From there, the first charge circuit controls subsequent charging phases of the first battery power source.

A second overriding operation 435 overrides the first charging phase of the second charge circuit based on the output from the first and the second internal fuel gauges residing below the activation threshold. The second overriding operation 435 is also performed by the common charge controller. If one of the battery power sources remains below the activation voltage, the common charge controller sends an override command to be executed at the second charge circuit, as well as the first charge circuit, to maintain the pre-charge phase regardless of the composite state of charge measurement taken at the second charge circuit. Once both the first and second battery power sources exceed the activation voltage as indicated by the first and second fuel gauges, respectively, the common charge controller may release its override command on the second charge circuit, as well as the first charge circuit. From there, the second charge circuit controls subsequent charging phases of the second battery power source.

An outputting operation 440 outputs driving power to one or more system loads in one or both of the device sections. The driving power may come from one or more of the battery power sources and an external power source depending on battery state of charge and whether the external power source is present. In various implementations, the outputting operation 440 also includes voltage regulation, which generally steps-down voltage to match the requirements of the system loads.

Figure 5:
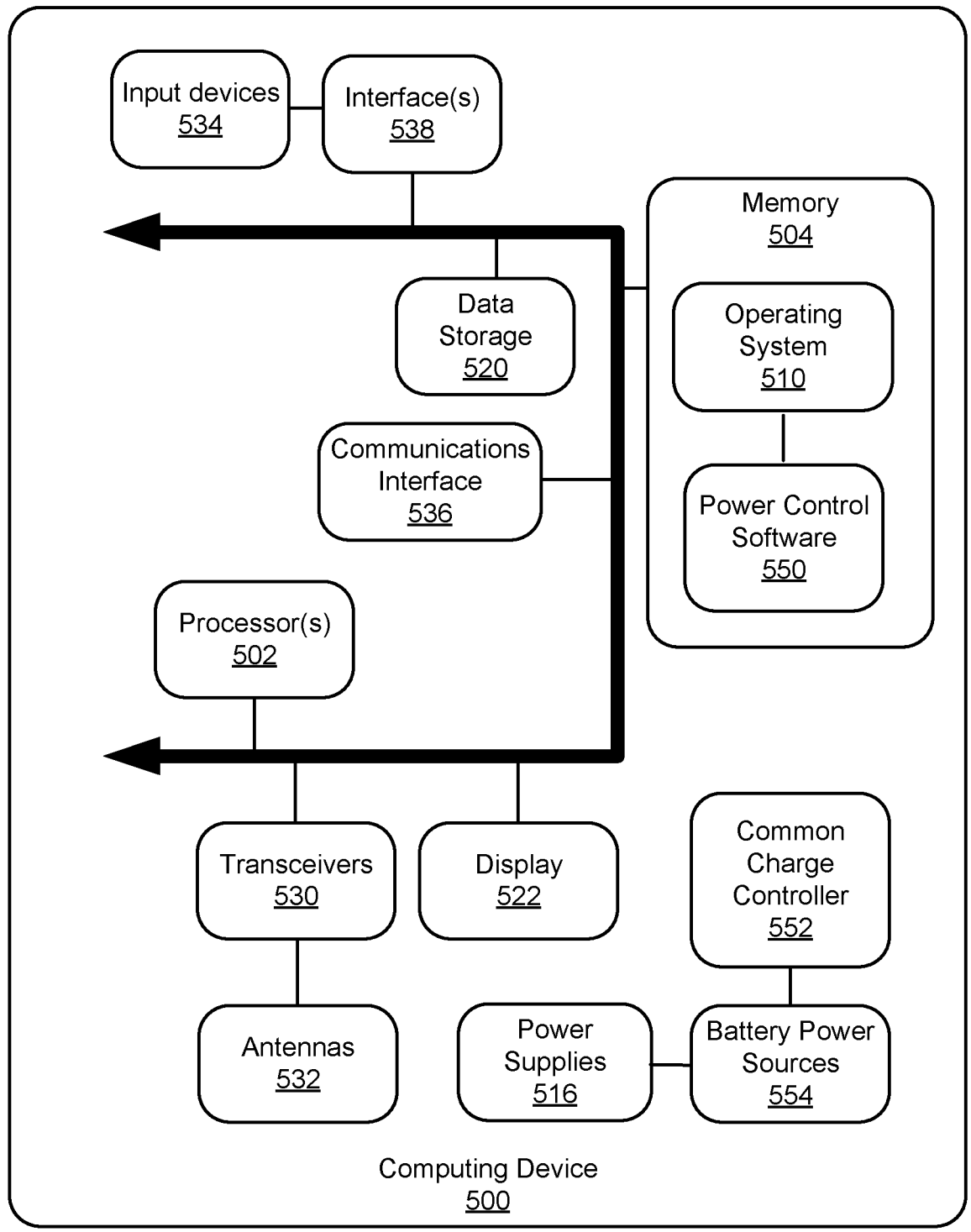
FIG. 5 illustrates an example computing device for use in providing a common charge controller for managing multiple batteries within the computing device.

FIG. 5 illustrates an example computing device 500 for use in providing a common charge controller 552 for managing multiple batteries 554 within the computing device 500. The computing device 500 may be a client device, such as a laptop, mobile device, desktop, tablet, or a server/cloud device. The computing device 500 includes one or more processor(s) 502 and a memory 504. The memory 504 generally includes both volatile memory (e.g., RAM) and non-volatile memory (e.g., flash memory). An operating system 510 resides in the memory 504 and is executed by the processor(s) 502.

One or more modules or segments, such as power control software 550, application modules, and other modules, are loaded into the operating system 510 on the memory 504 and/or data storage 520 and executed by processor(s) 502. In various implementations, the power control software 550 drives operation of the common charge controller 552. The data storage 520 may be store battery characteristics, charge levels, system load requirements, and other data and be local to the computing device 500 or may be remote and communicatively connected to the computing device 500.

The computing device 500 includes power supplies 516, which are powered by battery power sources 554 or other power sources and provide power to components of the computing device 500. The power supplies 516 may also be connected to an external power source that overrides or recharges battery cells within the battery power sources 554. The common charge controller 552 is electrically coupled to a charge circuit associated with each individual battery power source and provides overriding control of the charging state selected by each of the charge circuits.

The computing device 500 may include one or more communication transceivers 530 which may be connected to one or more antenna(s) 532 to provide network connectivity (e.g., mobile phone network, Wi-Fi®, Bluetooth®) to one or more other servers and/or client devices (e.g., mobile devices, desktop computers, or laptop computers). The computing device 500 may further include a communications interface 536, which may be used for establishing connections over a wide-area network (WAN) or local-area network (LAN). The network connections shown are exemplary and that other communications devices for establishing a communications link between the computing device 500 and other devices may be used.

The computing device 500 may further include one or more input devices 534 such that a user may enter commands and information (e.g., a keyboard or mouse). These and other input devices may be coupled to the computing device 500 by one or more interfaces 538 such as a serial port interface, parallel port, or universal serial bus (USB). The computing device 500 may further include a display 522, such as a touch screen display.

The computing device 500 may include a variety of tangible processor-readable storage media and intangible processor-readable communication signals. Tangible processor-readable storage can be embodied by any available media that can be accessed by the computing device 500 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 500. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, radio-frequency (RF), infrared, and other wireless media.

An example electronic device according to the presently disclosed technology comprises a first device section including a first battery power source, the first battery power source including a first internal fuel gauge, a second device section including a second battery power source, the second battery power source including a second internal fuel gauge, a first charge circuit to selectively direct power from an external power source to one or both of the first and the second battery power sources according to a first charging phase, the first charge circuit selecting the first charging phase based on a composite state of charge of the first and the second battery power sources detected at the first charge circuit residing above an activation threshold, and a common charge controller to override the first charging phase of the first charge circuit based on an output from one of the first and the second internal fuel gauges residing below the activation threshold.

Another example electronic device according to the presently disclosed technology further comprises a second charge circuit to selectively direct power from the external power source to one or both of the first and the second battery power sources also according to the first charging phase, the second charge circuit also selecting the first charging phase based on a composite state of charge of the first and the second battery power sources detected at the second charge circuit residing above the activation threshold, the common charge controller to override the first charging phase of the second charge circuit based on the output from one of the first and the second internal fuel gauges residing below the activation threshold.

In another example electronic device according to the presently disclosed technology, the first charge circuit is further to select the first charging phase from at least two available charging phases based on the detected composite state of charge at the first charge circuit.

In another example electronic device according to the presently disclosed technology, the first charging phase is selected from two or more of a pre-charge phase, a fast-charge phase, and an end-of-charge phase.

In another example electronic device according to the presently disclosed technology, the common charge controller further directs the first charging phase to be set to the pre-charge phase responsive to one of the first and the second internal fuel gauges indicating a state of charge below the activation threshold.

In another example electronic device according to the presently disclosed technology, the common charge controller further releases the first charging phase from the pre-charge phase responsive to both of the first and the second internal fuel gauges indicating a state of charge above the activation threshold.

In another example electronic device according to the presently disclosed technology, the override by the common charge controller is a programed command executed at the first charge circuit.

In another example electronic device according to the presently disclosed technology, the override by the common charge controller is a substitution of a lower current than that associated with the first charging phase in a register for the first charging phase at the first charge circuit.

In another example electronic device according to the presently disclosed technology, the first and the second battery power sources have disparate power storage characteristics.

In another example electronic device according to the presently disclosed technology, the first charge circuit includes a pair of field-effect transistors controlled by a charge controller.

Another example electronic device according to the presently disclosed technology further comprises a device section boundary oriented between the first and the second device sections, wherein the device section boundary is one of a hinged boundary and a flexible boundary.

An example method of controlling a transition between charging phases of an electronic device according to the presently disclosed technology comprises detecting a composite state of charge of a first battery power source within a first device section and a second battery power source within a second device section of the electronic device, selecting a first charging phase for a first charge circuit to selectively direct power from an external power source to one or both of the first and the second battery power sources based on the detected composite state of charge residing above an activation threshold, detecting a state of charge of the first battery power source at a first fuel gauge internal to the first battery power source, detecting a state of charge of the second battery power source at a second fuel gauge internal to the second battery power source, and overriding the first charging phase of the first charge circuit based on an output from one of the first and the second internal fuel gauges residing below the activation threshold.

Another example method according to the presently disclosed technology further comprises selecting the first charging phase for a second charge circuit to further selectively direct power from the external power source to one or both of the first and the second battery power sources based on the detected composite state of charge residing above the activation threshold, and overriding the first charging phase of the second charge circuit based on the output from the first and the second internal fuel gauges residing below the activation threshold.

In another example method according to the presently disclosed technology, the first charging phase is selected from two or more of a pre-charge phase, a fast-charge phase, and an end-of-charge phase.

In another example method according to the presently disclosed technology, the override is a programed command executed at the first charge circuit.

In another example method according to the presently disclosed technology, the override is a substitution of a lower current than that associated with the first charging phase in a register for the first charging phase at the first charge circuit.

An example electronic device according to the presently disclosed technology comprises a first device section including a first battery power source, the first battery power source including a first internal fuel gauge, a second device section including a second battery power source, the second battery power source including a second internal fuel gauge, a first charge circuit to selectively direct power from an external power source to one or both of the first and the second battery power sources according to a fast-charge phase, the first charge circuit selecting the fast-charge phase based on a composite state of charge of the first and the second battery power sources detected at the first charge circuit residing above an activation threshold, and a common charge controller to override the fast-charge phase of the first charge circuit and apply a pre-charge phase based on an output from one of the first and the second internal fuel gauges residing below the activation threshold.

Another example electronic device according to the presently disclosed technology further comprises a second charge circuit to selectively direct power from the external power source to one or both of the first and the second battery power sources also according to the fast-charge phase, the second charge circuit also selecting the fast-charge phase based on the composite state of charge of the first and the second battery power sources detected at the second charge circuit residing above the activation threshold, the common charge controller to override the fast-charge phase of the second charge circuit and apply a pre-charge phase based on the output from one of the first and the second internal fuel gauges residing below the activation threshold.

In another example electronic device according to the presently disclosed technology, the override by the common charge controller is a programed command executed at the first charge circuit.

In another example electronic device according to the presently disclosed technology, the override by the common charge controller is a substitution of a current associated with the pre-charge phase in place of a current associated with a fast-charge phase in a register for the fast-charge phase at the first charge circuit.

Some implementations may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, adding or omitting operations as desired, unless explicitly claimed otherwise or a specific order is inherently necessitated by the claim language.

What is claimed is:

1. An electronic device comprising:
    a first device section including a first battery power source and a first load external to the first battery power source, both of the first battery power source and the first load within a first housing, the first battery power source including a first internal fuel gauge;
    a second device section including a second battery power source and a second load external to the second battery power source, both of the second battery power source and the second load within a second housing, the second battery power source including a second internal fuel gauge;
    a first charge circuit configured to selectively direct power from an external power source to one or both of the first and the second battery power sources according to a first charging phase, the first charge circuit further configured to select the first charging phase based on a composite state of charge of the first and the second battery power sources detected at the first charge circuit residing above an activation threshold, the composite state of charge being a non-equivalent value between a first measurement of the state of charge of the first battery power source and a second measurement of the state of charge of the second battery power source defined by a mathematic relationship; and
    a common charge controller configured to override the first charging phase of the first charge circuit based on an output from one of the first and the second internal fuel gauges residing below the activation threshold.

2. The electronic device of claim 1, further comprising:
    a second charge circuit configured to selectively direct power from the external power source to one or both of the first and the second battery power sources also according to the first charging phase, the second charge circuit further configured to select the first charging phase based on a composite state of charge of the first and the second battery power sources detected at the second charge circuit residing above the activation threshold, the common charge controller further configured to override the first charging phase of the second charge circuit based on the output from one of the first and the second internal fuel gauges residing below the activation threshold.

3. The electronic device of claim 1, wherein the override by the common charge controller is a programed command executed at the first charge circuit.

4. The electronic device of claim 1, wherein the override by the common charge controller is a substitution of a lower current than that associated with the first charging phase in a register for the first charging phase at the first charge circuit.

5. The electronic device of claim 1, wherein the first and the second battery power sources have disparate power storage characteristics.

6. The electronic device of claim 1, wherein the first charge circuit includes a pair of field-effect transistors controlled by a charge controller.

7. The electronic device of claim 1, further comprising:
    a device section boundary oriented between the first and the second device sections, wherein the device section boundary is one of a hinged boundary and a flexible boundary.

8. The electronic device of claim 1, wherein the first charge circuit is further configured to select the first charging phase from at least two available charging phases based on the detected composite state of charge at the first charge circuit.

9. The electronic device of claim 8, wherein the first charging phase is selected from two or more of a pre-charge phase, a fast-charge phase, and an end-of-charge phase.

10. The electronic device of claim 9, wherein the common charge controller is further configured to direct the first charging phase to be set to the pre-charge phase responsive to one of the first and the second internal fuel gauges indicating a state of charge below the activation threshold.

11. The electronic device of claim 9, wherein the common charge controller is further configured to release the first charging phase from the pre-charge phase responsive to both of the first and the second internal fuel gauges indicating a state of charge above the activation threshold.

12. A method of controlling a transition between charging phases of an electronic device comprising:
    detecting a composite state of charge of a first battery power source within a first housing of a first device section including a first load, the first load external to the first battery power source, and a second battery power source within a second housing of a second device section including a second load, the second load external to the second battery power source, the composite state of charge being a non-equivalent value between a first measurement of the state of charge of the first battery power source and a second measurement of the state of charge of the second battery power source defined by a mathematic relationship;
    selecting a first charging phase for a first charge circuit to selectively direct power from an external power source to one or both of the first and the second battery power sources based on the detected composite state of charge residing above an activation threshold;
    detecting a state of charge of the first battery power source at a first fuel gauge internal to the first battery power source;
    detecting a state of charge of the second battery power source at a second fuel gauge internal to the second battery power source; and
    overriding the first charging phase of the first charge circuit based on an output from one of the first and the second internal fuel gauges residing below the activation threshold.

13. The method of claim 12, further comprising:
    selecting the first charging phase for a second charge circuit to further selectively direct power from the external power source to one or both of the first and the second battery power sources based on the detected composite state of charge residing above the activation threshold; and overriding the first charging phase of the second charge circuit based on the output from the first and the second internal fuel gauges residing below the activation threshold.

14. The method of claim 12, wherein the first charging phase is selected from two or more of a pre-charge phase, a fast-charge phase, and an end-of-charge phase.

15. The method of claim 12, wherein the override is a programed command executed at the first charge circuit.

16. The method of claim 12, wherein the override is a substitution of a lower current than that associated with the first charging phase in a register for the first charging phase at the first charge circuit.

17. An electronic device comprising:
a first device section including a first battery power source and a first load external to the first battery power source, both of the first battery power source and the first load within a first housing, the first battery power source including a first internal fuel gauge;
a second device section including a second battery power source and a second load external to the second battery power source, both of the second battery power source and the second load within a second housing, the second battery power source including a second internal fuel gauge;
a first charge circuit configured to selectively direct power from an external power source to one or both of the first and the second battery power sources according to a fast-charge phase, the first charge circuit further configured to select the fast-charge phase based on a composite state of charge of the first and the second battery power sources detected at the first charge circuit residing above an activation threshold, the composite state of charge being a non-equivalent value between a first measurement of the state of charge of the first battery power source and a second measurement of the state of charge of the second battery power source defined by a mathematic relationship; and
a common charge controller configured to override the fast-charge phase of the first charge circuit and apply a pre-charge phase based on an output from one of the first and the second internal fuel gauges residing below the activation threshold.

18. The electronic device of claim 17, further comprising:
a second charge circuit configured to selectively direct power from the external power source to one or both of the first and the second battery power sources also according to the fast-charge phase, the second charge circuit further configured to select the fast-charge phase based on the composite state of charge of the first and the second battery power sources detected at the second charge circuit residing above the activation threshold, the common charge controller further configured to override the fast-charge phase of the second charge circuit and apply a pre-charge phase based on the output from one of the first and the second internal fuel gauges residing below the activation threshold.

19. The electronic device of claim 17, wherein the override by the common charge controller is a programed command executed at the first charge circuit.

20. The electronic device of claim 17, wherein the override by the common charge controller is a substitution of a current associated with the pre-charge phase in place of a current associated with a fast-charge phase in a register for the fast-charge phase at the first charge circuit.

* * * * *